(12) United States Patent
Cambou

(10) Patent No.: US 10,491,408 B2
(45) Date of Patent: *Nov. 26, 2019

(54) PUF HARDWARE ARRANGEMENT FOR INCREASED THROUGHPUT

(71) Applicant: Arizona Board of Regents on Behalf of Northern Arizona University, Flagstaff, AZ (US)

(72) Inventor: Bertrand Francis Cambou, Flagstaff, AZ (US)

(73) Assignee: ARIZONA BOARD OF REGENTS ON BEHALF OF NORTHERN ARIZONA UNIVERSITY, Flagstaff, AZ (US)

(*) Notice: Subject to any disclaimer, the term of this patent is extended or adjusted under 35 U.S.C. 154(b) by 0 days.

This patent is subject to a terminal disclaimer.

(21) Appl. No.: 16/201,827

(22) Filed: Nov. 27, 2018

(65) Prior Publication Data

US 2019/0095610 A1  Mar. 28, 2019

Related U.S. Application Data

(63) Continuation of application No. 15/347,727, filed on Nov. 9, 2016, now Pat. No. 10,185,820.

(51) Int. Cl.
*H04L 9/32* (2006.01)
*G06F 21/46* (2013.01)
(Continued)

(52) U.S. Cl.
CPC ............ *H04L 9/3278* (2013.01); *G06F 21/44* (2013.01); *G06F 21/46* (2013.01); *H04L 9/0643* (2013.01); *H04L 9/0866* (2013.01); *H04L 9/0869* (2013.01); *H04L 9/3226* (2013.01); *G06F 2221/2103* (2013.01)

(58) Field of Classification Search
CPC .. G06F 21/46; G06F 21/44; G06F 2221/2103; H04L 9/3226; H04L 9/0866; H04L 9/3278; H04L 9/0643; H04L 9/0869
See application file for complete search history.

(56) References Cited

U.S. PATENT DOCUMENTS 8,868,923 B1  10/2014  Hamlet et al.
2009/0183248 A1  7/2009  Tuyls et al.
(Continued)

*Primary Examiner* — Huan V Doan
(74) *Attorney, Agent, or Firm* — Quarles & Brady LLP

(57) ABSTRACT

The present invention provides a method for authenticating distributed peripherals on a computer network using an array of physically unclonable functions (PUF). As each PUF is unique, each PUF is able to generate a plurality of challenge response pairs that are unique to that PUF. The integrated circuits of the PUF comprise a plurality of cells, where a parameter (such as a voltage) of each cell may be measured (possibly averaged over many readings). The plurality of cells in the PUF may be arranged in a one, two or more dimensional matrix. A protocol based on an addressable PUF generator (APG) allows the protection of a network having distributed peripherals such as Internet of things (IoT), smart phones, lap top and desk top computers, or ID cards. This protection does not require the storage of a database of passwords, or secret keys. and thereby is immune to traditional database hacking attacks.

18 Claims, 15 Drawing Sheets

(51) Int. Cl.
*G06F 21/44* (2013.01)
*H04L 9/08* (2006.01)
*H04L 9/06* (2006.01)

(56) References Cited

U.S. PATENT DOCUMENTS

| | | | | |
|---|---|---|---|---|
| 2011/0239002 | A1* | 9/2011 | Beckmann | G06F 9/455 |
| | | | | 713/189 |
| 2015/0071432 | A1* | 3/2015 | Zhu | G11C 11/1673 |
| | | | | 380/28 |
| 2015/0269378 | A1* | 9/2015 | Falk | H04L 9/3278 |
| | | | | 726/6 |
| 2017/0038807 | A1* | 2/2017 | Bittlestone | G06F 1/26 |
| 2017/0178710 | A1* | 6/2017 | Augustine | G11C 7/24 |
| 2017/0277457 | A1* | 9/2017 | Lu | G11C 11/41 |

* cited by examiner

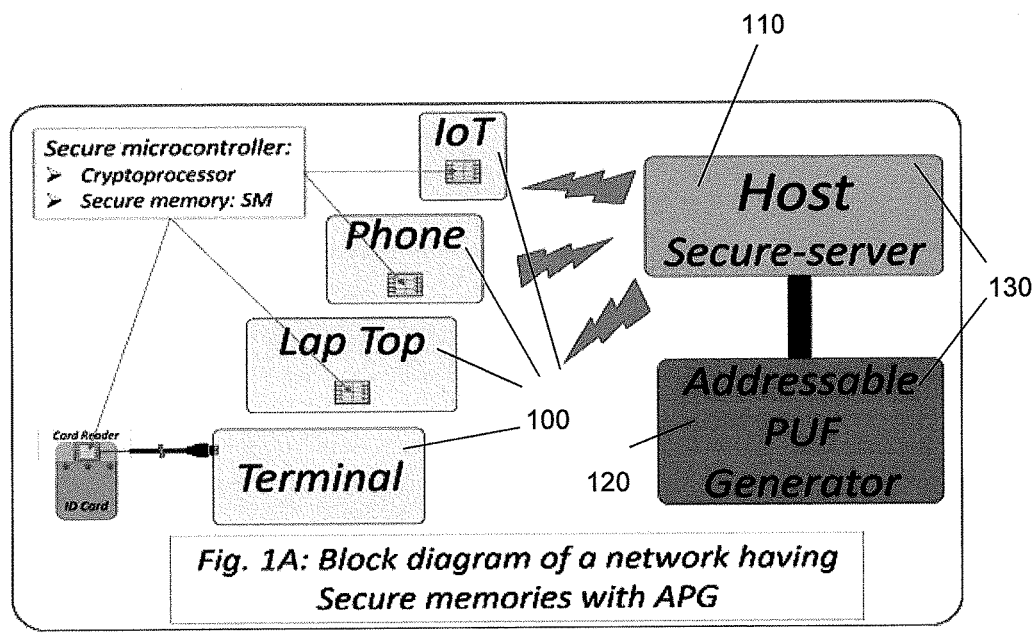
Fig. 1A: Block diagram of a network having Secure memories with APG
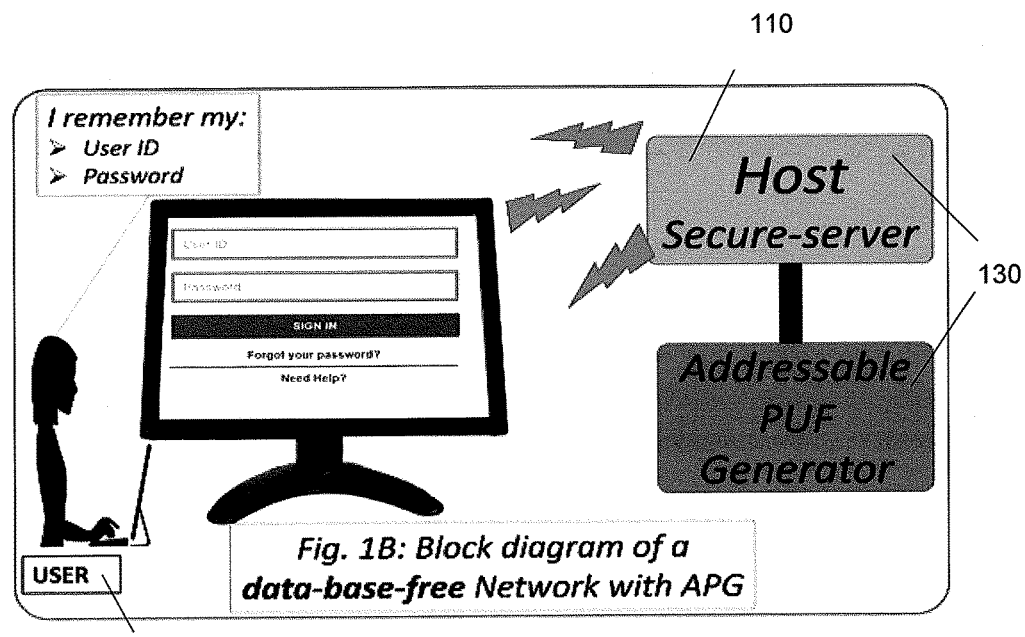
Fig. 1B: Block diagram of a data-base-free Network with APG

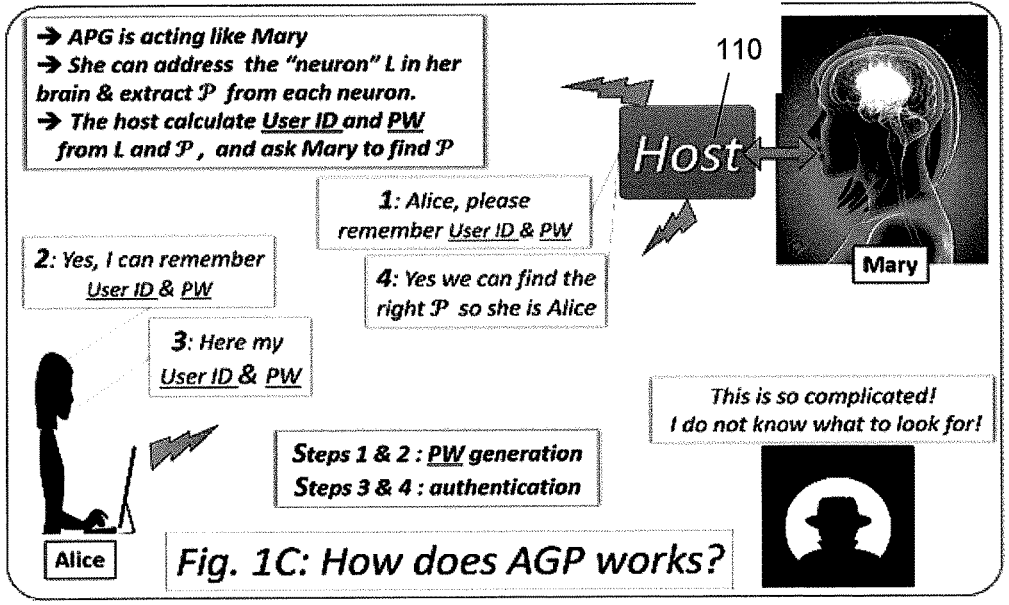
Fig. 1C: How does AGP works?
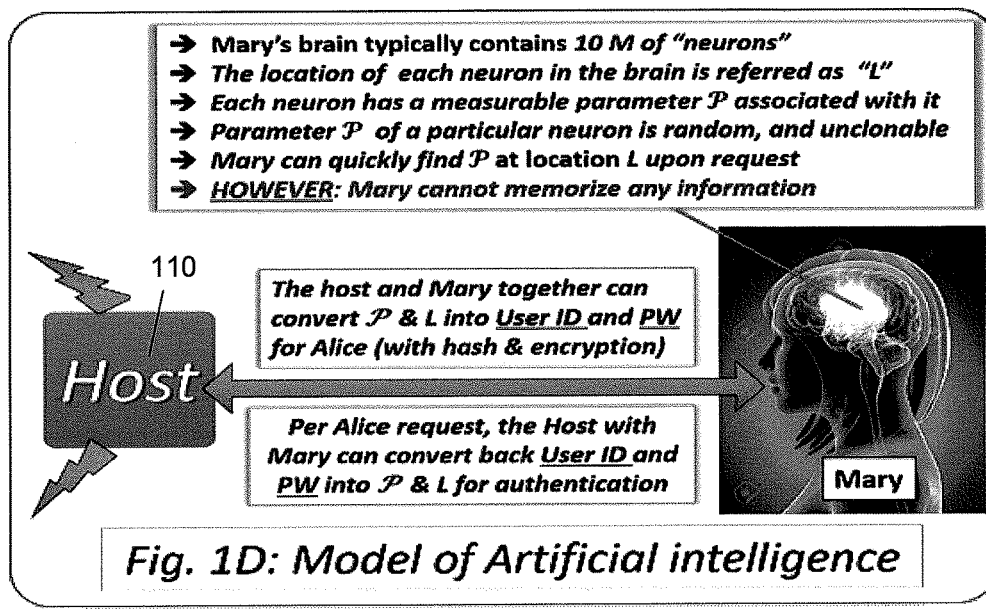
Fig. 1D: Model of Artificial intelligence

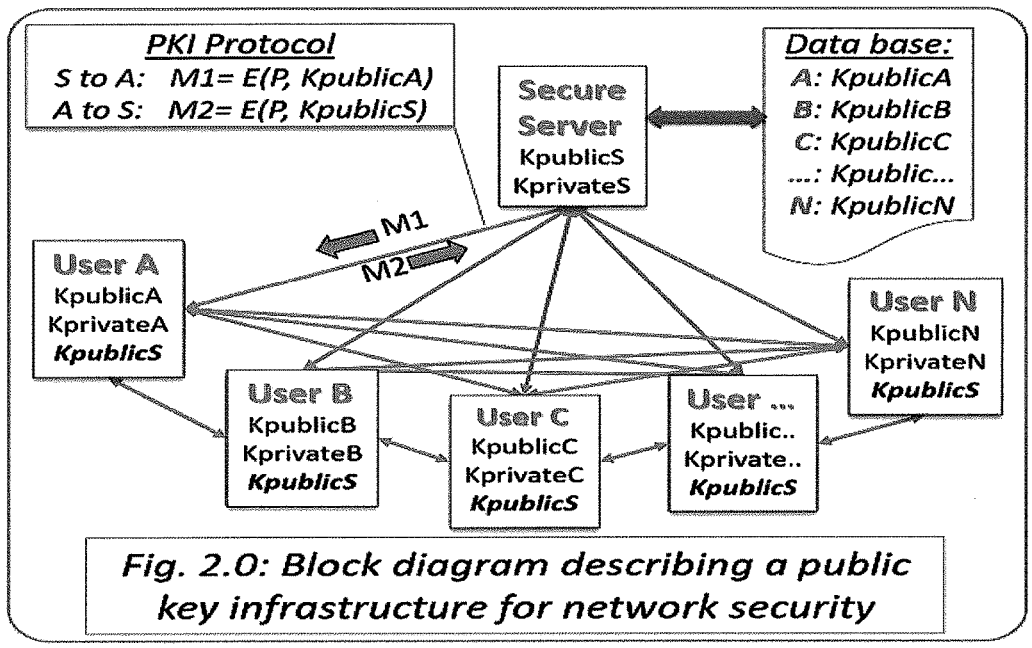
Fig. 2.0: Block diagram describing a public key infrastructure for network security
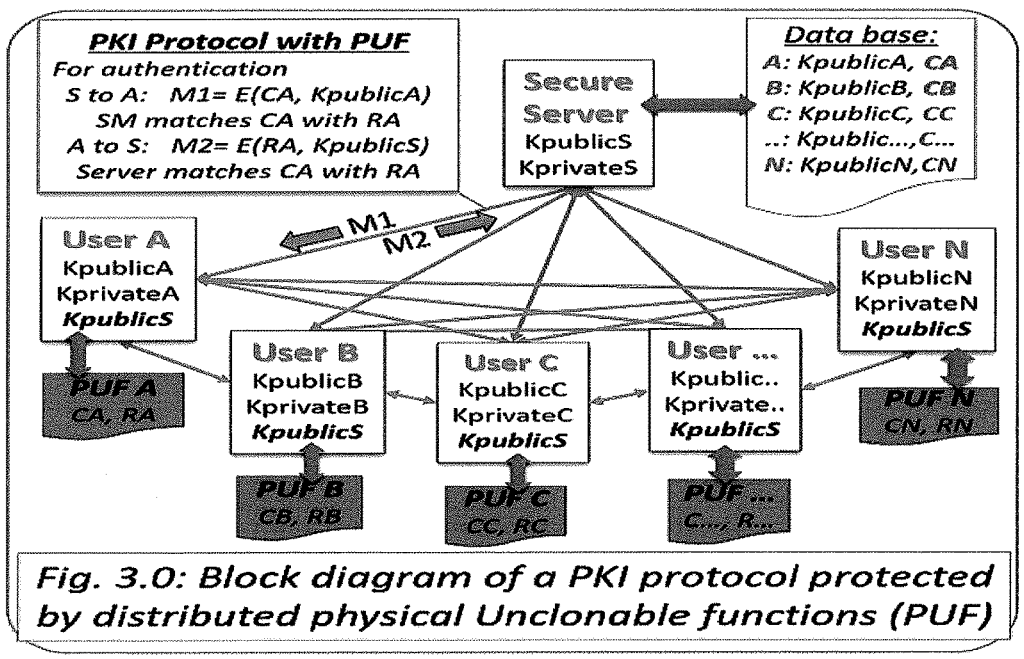
Fig. 3.0: Block diagram of a PKI protocol protected by distributed physical Unclonable functions (PUF)

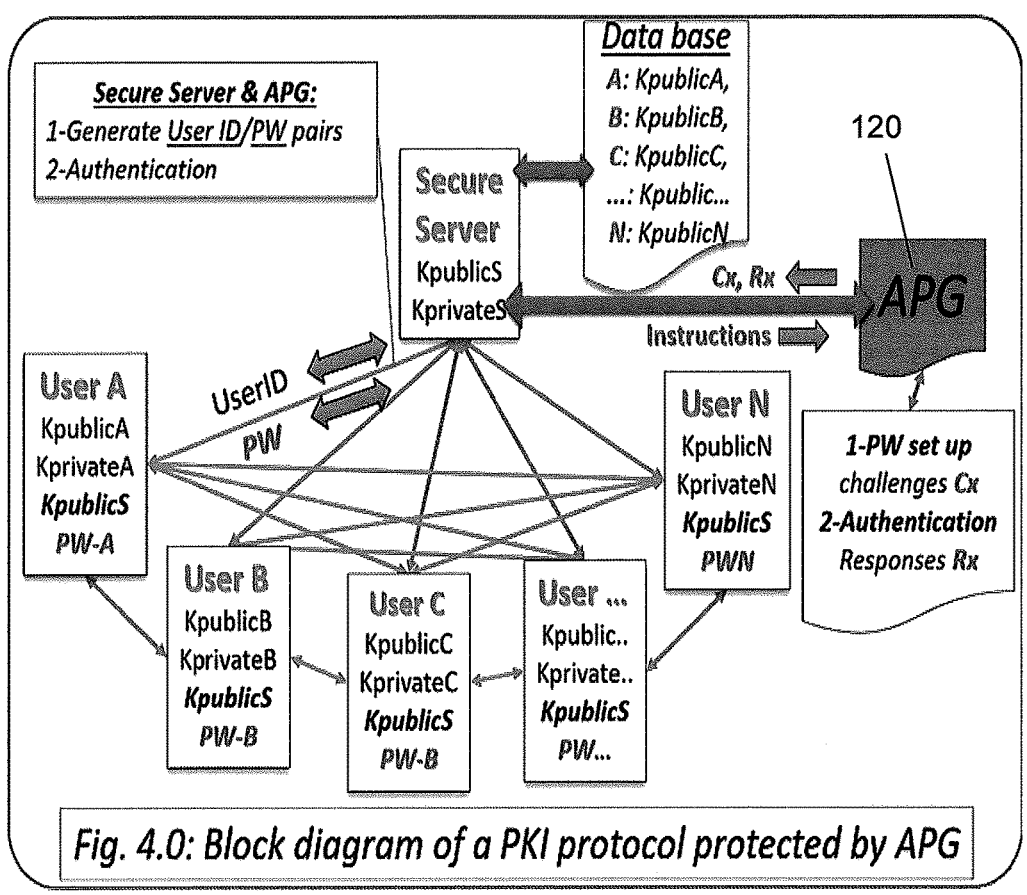
Fig. 4.0: Block diagram of a PKI protocol protected by APG

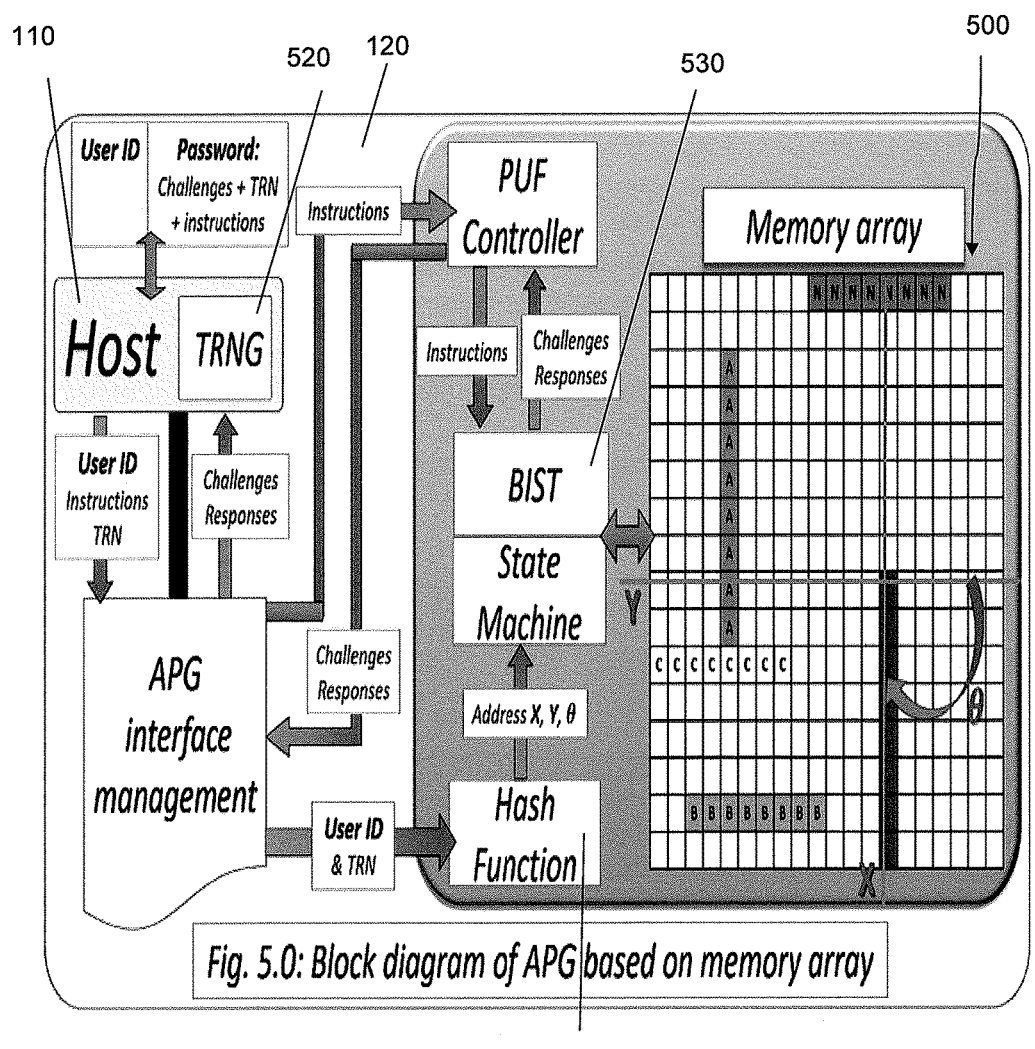
Fig. 5.0: Block diagram of APG based on memory array

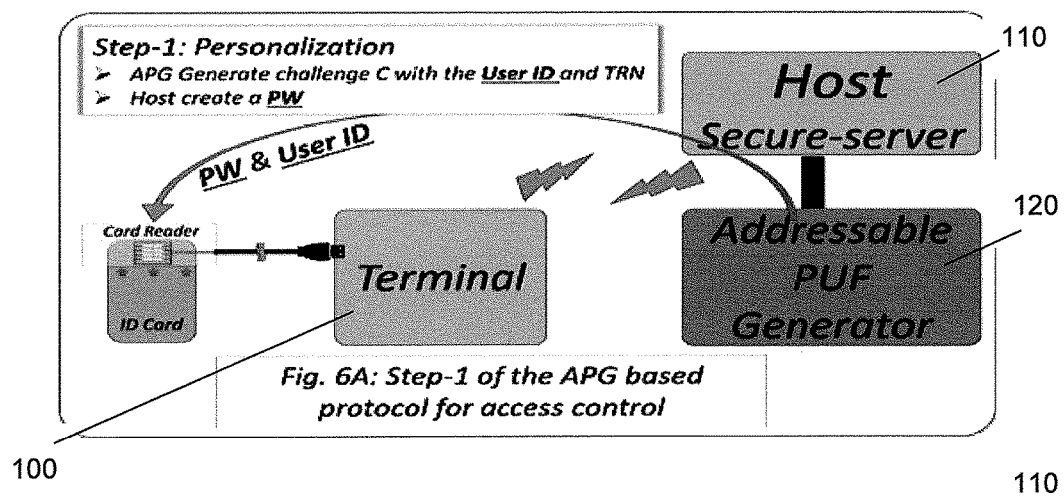

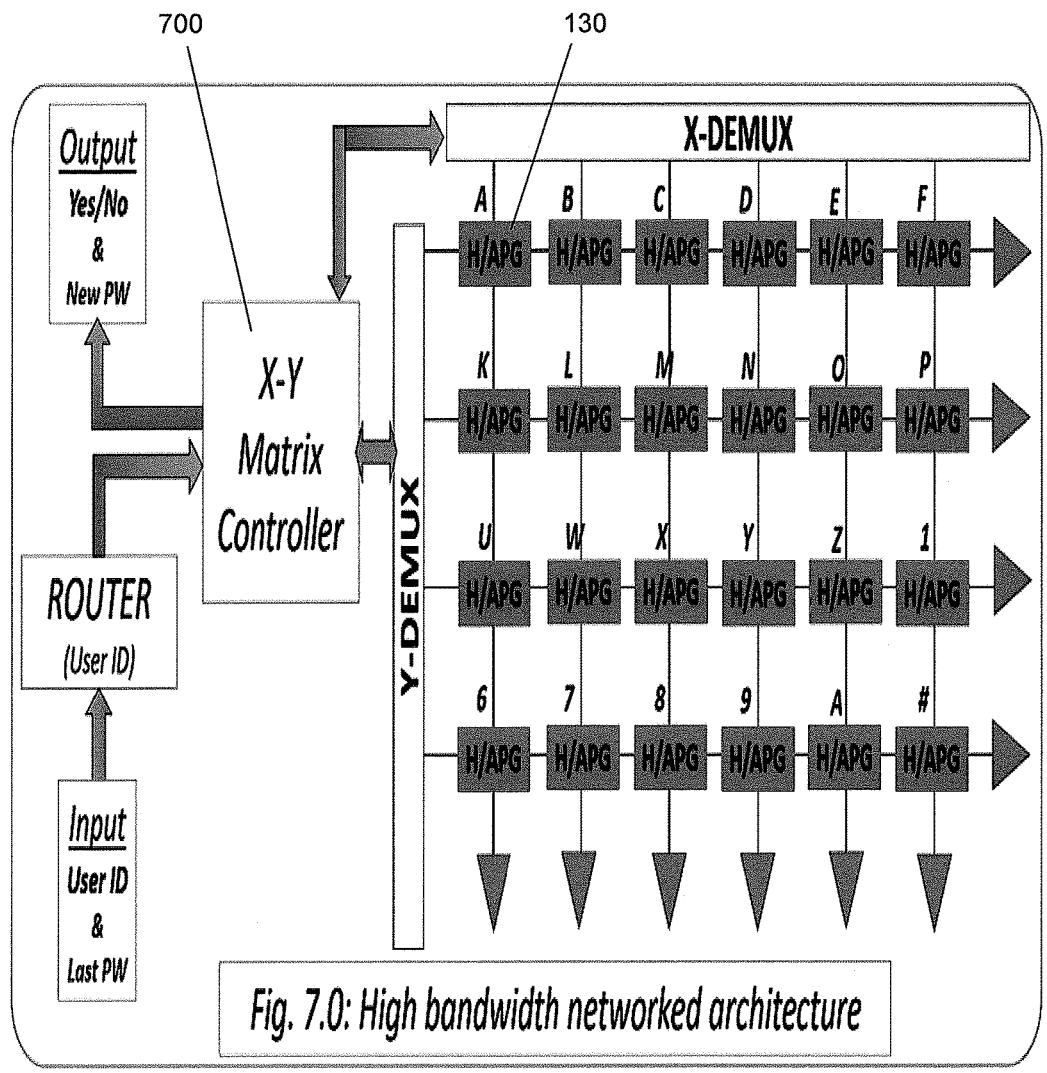
Fig. 7.0: High bandwidth networked architecture

PUF HARDWARE ARRANGEMENT FOR INCREASED THROUGHPUT

CROSS-REFERENCE TO RELATED APPLICATIONS

This application claims priority to U.S. patent application Ser. No. 15/347,727 filed on Nov. 9, 2016, the entire contents of which is incorporated herein by reference.

FIELD OF THE INVENTION

The present invention generally relates to a method of using a physically unclonable function (PUF) to generate a challenge response pair and authenticate a distributed peripheral, without storing user identifications, passwords, challenges and/or responses in a database.

SUMMARY OF THE INVENTION

The present invention provides a method for authenticating distributed peripherals on a computer network using an array of physically unclonable functions (PUF). A PUF is hereby defined to be an electronic component (such as a set of cells of a memory array) that has unique properties compared to all other PUFs due to variations in the manufacturing process for each PUF. In other words, it would be either extremely difficult or impossible to duplicate or clone the integrated circuits in the PUF. As each PUF is unique, each PUF is able to generate a plurality of challenge response pairs that are unique to that PUF. The electronic component of the PUF comprise a plurality of cells, where a parameter (such as a voltage necessary to switch the cell from one state to another state) of each cell may be measured (possibly averaged over many readings). As non-limiting examples, the measurements for each cell may be converted into a digital value of any desired base, but is preferably represented in either binary or ternary values. In addition, the plurality of cells in the PUF may be arranged in a one, two or more dimensional matrix. The distributed peripherals are hereby defined to be physical electronic devices, such as terminals, computers, lap tops, cell phones and/or connected devices on an Internet of Things (IoT).

In an embodiment of the invention, a method is disclosed for generating a password from a PUF. A host may transmit a user identification, a random number and optionally an instruction to an addressable PUF generator (APG) interface manager. An input to a hash function may be generated using the user identification and the random number, which, as a non-limiting example, may be created by adding the user identification and the random number. The hash function may generate a hash digest based on the input to the hash function, wherein the hash digest identifies a location (a particular cell or group of cells) in the array of PUFs. In preferred embodiments, the location may comprise a horizontal location, a vertical location and an angle or direction. A PUF controller may generate a challenge from the PUF at the selected location using the instruction. The instruction may be anything (or nothing at all) as desired. As a non-limiting example, the instruction may be to create a challenge or a response using the eight (or any other desired number) cells below (or any other desired angle or direction) a cell identified by the location. A password may be created using the instruction, the random number and the challenge, wherein the password is configured to be converted back into the instruction, the random number and the challenge. As non-limiting examples, the random number may be added, subtracted, multiplied or divided by the user identification. The host may transmit the password to a distributed peripheral and the distributed peripheral preferably stores the password in a secure memory (SM). After transmitting the password to the distributed peripheral, the host does not retain or store the user identification or the password so as to prevent a hacker from obtaining the user identification or the password from the host.

In other words, the user identification and the password are only stored with a corresponding distributed peripheral and the challenge and the response are built into the manufacturing variations of the array of PUFs. As the method does not include storing user identifications, passwords, challenges or responses in a central database(s), this method has the advantage of preventing hackers from downloading a large number of user identifications, passwords, challenges and/or responses from a central database.

In another embodiment of the invention, a method is disclosed for authenticating a distributed peripheral on a computer network using an array of PUFs. A host may receive a user identification and a password from the distributed peripheral. The host may convert the password into an instruction, a random number and a challenge. An input to a hash function may be generated using the user identification and the random number. The hash function may generate a hash digest based on the input to the hash function, wherein the hash digest identifies the particular location within the array of PUFs that was previously addressed to generate the challenge. A PUF controller may generate a response from the location in the array of PUFs using the instruction. The response may be compared to the challenge. Upon determining the response matches the challenge within a predetermined statistical limit, the distributed peripheral may be authenticated. If the response does not match the challenge within the predetermined statistical limit, the distributed peripheral is not authenticated.

In another embodiment of the invention, a method is disclosed for an addressable physically unclonable function generator (APG) to authenticate a distributed peripheral. In preferred embodiments, the APG comprises an array of physically unclonable functions (PUFs) and receives a user identification and a password from a distributed peripheral. The APG may convert the user identification and the password into a binary stream of bits. The APG may decrypt the binary stream of bits and convert the decrypted binary stream of bits into a first ternary stream of data. The APG may remove all binary elements from the first ternary stream of data while retaining all X's in their respective locations. The APG may generate an input to a hash function based on the user identification and the random number. The hash function may generate a hash digest based on the input to the hash function, wherein the hash digest identifies a location in the array of PUFs. The APG may locate a plurality of cells at the location in the array of PUFs corresponding to a response. The APG may measure a parameter for each cell in the plurality of cells at the location in the array of PUFs corresponding to the response that does not have an X. To save time, the APG does not need to measure a parameter for each cell in the plurality of cells at the location in the array of PUFs corresponding to the response that has an X. The APG may assign a zero to each cell in the plurality of cells in the array of PUFs with a parameter below a predetermined range. The APG may assign a one to each cell in the plurality of cells in the array of PUFs with a parameter above a predetermined range, thereby creating a second ternary stream of data. The APG may determine a challenge response error rate by comparing the first ternary stream of data with the second ternary stream of data. Upon determining by the APG the challenge response error rate is below a predetermined threshold, the distributed peripheral is authenticated. If the challenge response error rate is above a predetermined threshold, the distributed peripheral is not authenticated.

In another embodiment, a method is disclosed for a host and an addressable physically unclonable function generator (H/APG) in a plurality of H/APGs to generate a password and authenticate a distributed peripheral. Using a plurality of H/APGs allows the system to be scaled up and improves the speed and efficiency of the invention. A matrix controller may determine a first horizontal axis and a first vertical axis in a matrix of a plurality of H/APGs based on a user identification of a distributed peripheral. The matrix controller may address a first H/APG in the plurality of H/APGs using the first horizontal axis and the first vertical axis. The first H/APG in the plurality of H/APGs may generate a first password configured to reveal a challenge. The first password may be transmitted over a computer network to the peripheral device. When the distributed peripheral desires to be authenticated, the matrix controller may receive from the distributed peripheral the user identification and a second password. The matrix controller may determine a second horizontal axis and a second vertical axis in the matrix of the plurality of H/APGs based on the user identification. The matrix controller may address a second H/APG in the plurality of H/APGs using the second horizontal axis and the second vertical axis. The second H/APG in the plurality of H/APGs may generate a response. The second H/APG in the plurality of H/APGs may reveal the challenge from the second password. The challenge may be compared to the response. Upon determining the challenge matches the response within a predetermined statistical limit, the distributed peripheral may be authenticated. Upon determining the challenge does not match the response within a predetermined statistical limit, the distributed peripheral is not authenticated. In preferred embodiments, the matrix of the plurality of H/APGs is configured so that two or more H/APGs in the matrix of the plurality of H/APGs may generate passwords and/or authenticate distributed peripherals at overlapping times. Allowing a plurality of H/APGs in the matrix to operate at the same or overlapping times greatly increases the speed and efficiency of the invention.

The above features and advantages of the present invention will be better understood from the following detailed description taken in conjunction with the accompanying drawings.

BRIEF DESCRIPTION OF THE DRAWINGS

FIG. 1A is a block diagram of a network having secure memories with an addressable PUF generator (APG).

FIG. 1B is a block diagram of a data-base-free network with an APG.

FIG. 1C is a block diagram explain how APG works.

FIG. 1D is a block diagram of a model of artificial intelligence.

FIG. 2.0 is a block diagram describing a public key infrastructure (PKI) for network security.

FIG. 3.0 is a block diagram of a PKI protocol protected by distributed physical unclonable functions (PUF).

FIG. 4.0 is a block diagram of a PKI protocol protected by APG.

FIG. 5.0 is a block diagram of an APG based on a memory array.

FIG. 6A is a step-1 of the APG based protocol for access control.

FIG. 6B is a step-2 of the APG based protocol for access control.

FIG. 6C is a step-3 of the APG based protocol for access control.

FIG. 7 is a block diagram of a high bandwidth networked architecture.

DETAILED DESCRIPTION

Figure 8:
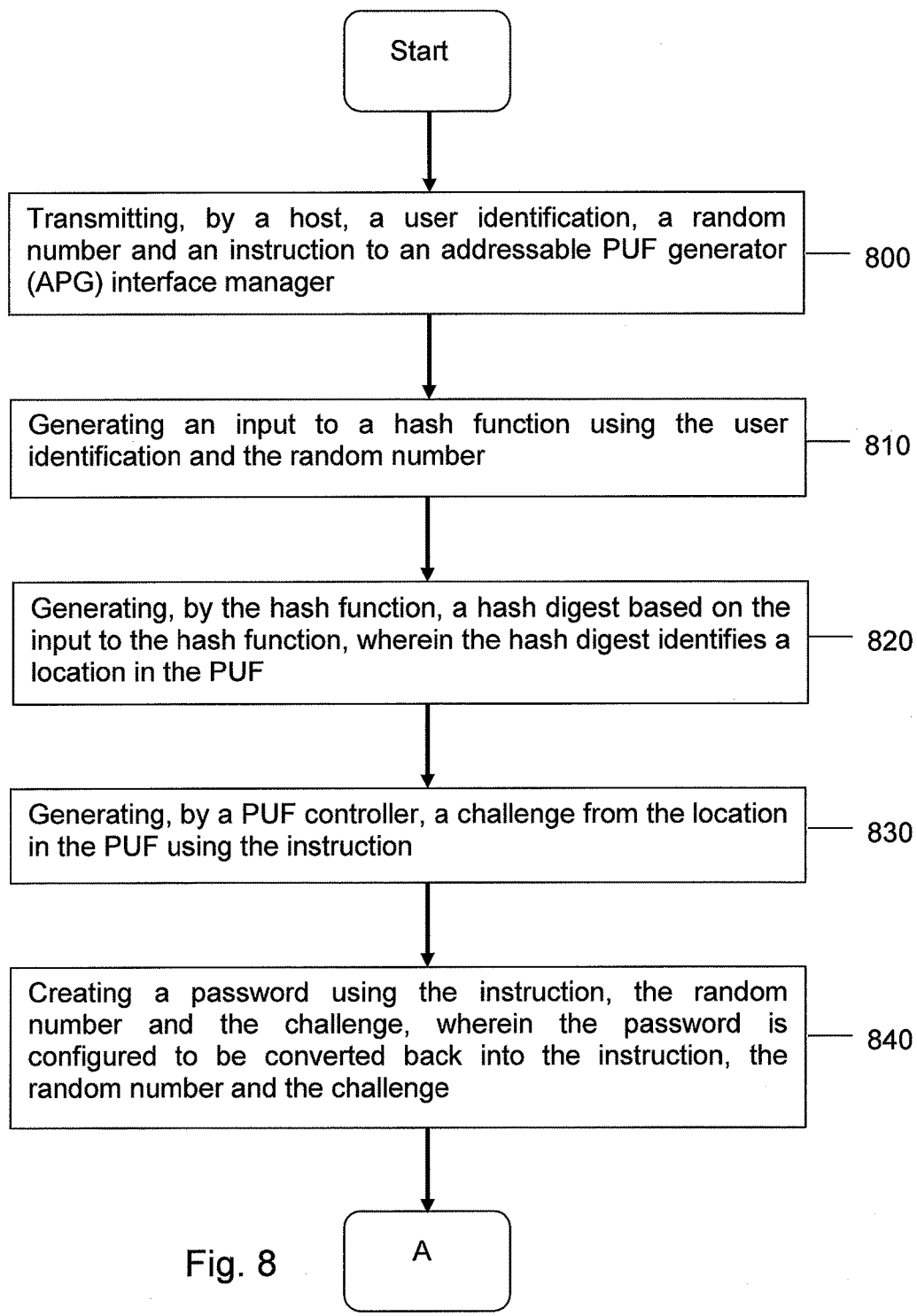
FIGS. 8-10 are flowcharts illustrating a method of generating a password and authenticating a distributed peripheral.

The present inventions will now be discussed in detail with regard to the attached drawing figures that were briefly described above. In the following description, numerous specific details are set forth illustrating the Applicant's best mode for practicing the invention and enabling one of ordinary skill in the art to make and use the invention. It will be obvious, however, to one skilled in the art that the present invention may be practiced without many of these specific details. In other instances, well-known machines, structures, and method steps have not been described in particular detail in order to avoid unnecessarily obscuring the present invention. Unless otherwise indicated, like parts and method steps are referred to with like reference numerals.

One of the most commonly reported cyber-attacks is the loss of extremely large databases of user identifications (User ID) and passwords. Recent events reported in the news include hackers stealing such databases within US government agencies, IRS, health institutions, political parties, banks, and many others. These types of cyber-attacks create huge financial losses and psychological traumas. The essence of access control is to match a password, a secret key, a biometric print, or any other reference pattern that is associated with a particular user 140 or distributed peripheral 100 against the same reference pattern that is stored in the secure host 110. So all networks are faced with the same dilemma, i.e., how to protect the database of reference patterns. In departure from current practices, and prior arts, the current invention is a novel access control protocol disclosed in this document that does not require the existence of a centralized database which is a recipient of reference patterns.

Referring to the block diagrams in FIGS. 1A-1D and FIG. 5, a novel protocol is illustrated with a host 110 driving an addressable PUF generator 120 (APG). The protocol may provide a method for authenticating distributed peripherals 100 on a computer network using a physically unclonable function 500 (PUF) that may be in an array of PUFs. The PUF 500 is an electronic component or an integrated circuit (such as a memory array) that is unique compared to all other PUFs due to variations in the manufacturing process for each PUF 500. In other words, it would be either extremely difficult or impossible to duplicate or clone the electronic component or integrated circuits in the PUF 500. As each PUF 500 is unique, each PUF 500 is able to generate a challenge response pair that is unique to that PUF 500. The integrated circuits of the PUF 500 comprise a plurality of cells (or nodes), where a parameter (such as a voltage) of each cell may be measured (possibly averaged over many readings). As non-limiting examples, the measurements for each cell may be converted into a digital value of any desired base, but is preferably represented in binary, ternary, quaternary or some other multi-states values. In addition, the plurality of cells in the PUF 500 may be arranged in a one, two or more dimensional matrix. The distributed peripherals 100 are hereby defined to be physical electronic devices, such as terminals, computers, lap tops, cell phones and/or connected devices on an Internet of Things (IoT).

An APG 120 is based on the PUF technology and does not include a database of reference patterns, such as the ones matching a user identification (user ID) or a password. Each distributed peripheral 100 needs to have the capability to store, or memorize, authentication patterns (such as user identifications and passwords).

As shown in FIG. 1A, these reference patterns are preferably stored within a trusted secure memory (SM) of a distributed peripheral 100. Secure elements designed with a secure microcontroller and embedded non-volatile memory are commercially available at a low cost. Other methods to store a reference pattern, and act as a virtual SM, are also commercially available in various distributed peripherals 100 such as computers, work stations, smart phones and Internet of Things (IoT) of a cyber physical system (CPS).

The APG 120 may generate reference patterns, and download the reference patterns in the SMs of the distributed network. The APG 120 may generate on demand fresh patterns during authentication to check whether they match with previously distributed reference patterns.

In an embodiment of the invention, the protocol may be based on an APG 120 and enhanced with other cryptographic methods, such as public key infrastructure (PKI), or symmetrical cryptography, having their own centralized database. Optionally, it may be possible to replace a password after a single use; the APG 120 can quickly generates and download to the SM new passwords, thereby making pointless the hacking of a password during authentication.

Another embodiment of the invention, as presented in FIG. 1B, does not require the use of a secure memory (SM). The user 140 can enter the user identification and the password which the host 110 may use with the APG 120 for authentication. In this embodiment, there is no database storing the password in the entire cyber physical system, from client to host 110.

A general description on how APG 120 may work is shown in FIGS. 1C and 1D which use an artificial intelligence analogy. The APG 120 may act like a very large array of addressable neurons of the brain of "Mary". The address of a neuron, or its location L, may be calculated with a hash function 510 based on the user identification. The hash function 510 is preferably a one-way hash function. At that location L, Mary can extract the unique properties $\mathcal{P}$ of a neuron; $\mathcal{P}$ is varying randomly neuron to neuron. These properties are called physically unclonable functions 500 (PUFs), they cannot be cloned. The host 110 can convert $\mathcal{P}$ into a password for "Alice", the user 140, by encrypting $\mathcal{P}$ with a random number. The random number may be a pseudo random number or a true random number generated by any desired method, such as by using a true random number generator 520 (TRNG). Conversely, when Alice sends back the user identification and password, the host 110 may ask Mary to look again at the same location L so that she can get the same exact $\mathcal{P}$ for authentication. The hash functions 510 are one-way cryptographic functions and can convert the combination user identification and random number into an address pointing at the location L, where $\mathcal{P}$ can be extracted for the purpose of authentication, or password generation. The hacker, Black-hat, cannot directly retrieve information from an APG 120; APGs do not have traditional memory capabilities, and cannot store information like a database with a user identification linked or pointing to a password. In the unlikely event that a Black Hat finds a way to extract P at location L, the one-way hash function 510 cannot work backwards, and cannot be used to retrieve the user identification and password pair. To extract $\mathcal{P}$ is harder than reading a database, takes 1,000 times longer, requires additional information on the method to extract P, and access to a Built-In-Self-Test module 530 (BIST), thereby reducing the likelihood of a hack (stolen information).

Public key infrastructure (PKI) is a cryptographic method. Referring to FIG. 2, each user 140 has a pair of keys, a public key that is not secret and a highly secret private key. One of these two keys can be indifferently used to encrypt a message, the second key being the only one capable of decrypting the message. Non-limiting examples of widely used algorithms for PKI includes RSA and elliptic curves (ECC). After distribution of the secret key, as shown in FIG. 2.0, the protocol of communication between the secure server and the SMs is extremely protected.

A loss to a hacker of the database of public keys is irrelevant because this database is "public". However, this protocol has several weaknesses; the main weakness is that the key distribution method is complicated. The public-private key generation and distribution is in general done by a third party, and could be rather expensive for a CPS. If a node of the network is compromised, the distribution of a new key could be exposed to hacking. A two-way protection with non-repudiation requires a double encryption with the private key of the emitting party, and the public key of the receiving party. The loss of the private key of the network can represent a total loss of the trust of the security protocol.

Physically Unclonable Functions (PUFs) can generate from hardware components the equivalent of human DNA or finger prints to strengthen the level of security of authentication protocols, and this as part of a set of cryptographic primitives. PUFs 500 exploit intrinsic natural manufacturing variations, which are introduced during fabrication of the devices such as, as non-limiting examples, local variations in critical dimensions, doping levels of semiconducting layers, and threshold voltages [4-23]. These variations make each device unique and identifiable from each other.

The underlying mechanism of a PUF 500 is the creation of a large number of challenge (i.e. input) response (i.e. output) pairs (called CRPs) that are unique to each PUF 500. During the authentication cycles, the PUFs 500 may be queried with challenges. The authentication is granted when the rate of matching CRPs is statistically high enough, i.e., above a predetermined threshold or level. A PKI protocol using a set of distributed PUFs for access control is shown in FIG. 3.0.

Each user 140 (client) is associated with its own PUF 500 which has to generate upfront a challenge that is stored in the central database as a reference pattern which is under the control of the secure server. Such a protocol is significantly safer than a basic PKI, however the centralized database which keeps track of the challenges of the distributed PUFs 500 is vulnerable and has to be protected with absolute secrecy to maintain the integrity of the cryptographic system.

Memory arrays may be used to generate PUFs. As non-limiting examples, Table 1.0 lists various types of memory arrays that may be used to create a PUF 500. As non-limiting examples, the PUFs may comprise SRAM memories, DRAM memories, Resistive RAM memories, magnetic memories, flash memories, EEPROM memories, OTP memories, ring oscillator PUFs, gate delay oscillators, optical PUFs, sensors and MEMS PUFs. In some embodiments, PUFs 500 may only need 128 to 256 bits, while commercially secure memory arrays (SM), which may be integrated within secure micro-controllers, may have memory densities in the mega-byte range.

TABLE 1.0

Previously reported methods to generate PUF challenge-response-pairs from memory arrays.

| MEMORY | Parameter for PUF Generation | Quality |
|---|---|---|
| SRAM | Random Flip of the 6T cell: start as a "0" or a "1" after power up | Mainstream but not always secure |
| DRAM | Discharge the capacitors, then measure voltage: Get a "0" or a "1" | Need constant refresh |
| ReRAM | Variations of the value of the Vset: Define a "0" or a "1" | Quite novel |
| MRAM | Variations of the Rmax's after programming: Define a "0" or a "1" | Quite novel |
| Flash | Partial programming, then measure thresold: Get a "0" or a "1" | Slow programming |

One of the generic methods to generate CRPs is to characterize a particular parameter $\mathcal{P}$ of the cells of the array with a "built-in-self-test" BIST 530 module. Each cell being different, the value of parameter $\mathcal{P}$ varies cell to cell and follows a distribution with a median value T For challenge and response generation, all cells with $\mathcal{P}$ below T can may be then considered as a "0" and all others may be considered as a "1".

Assuming that these measurements are reproducible, which has been experimentally proven, the resulting streams of data generated by the method may be used as cryptographic primitives to authenticate the memory array as memory arrays randomly vary due to manufacturing variations. Thus, as a non-limiting example, one way to design addressable PUF generators 120 (APGs) is to use memory based PUFs 500.

FIG. 4.0 illustrates an example embodiment describing a PKI protocol similar to the ones presented in FIG. 2.0 and FIG. 3.0 having an APG 120 module for authentication. This particular combination of the APG 120 with PKI is an example of a cryptographic protocol taking advantage of both architectures to enhance the level of security during authentication. The APG architecture does not have to be combined with the PKI.

The host 110 and APG 120 (H/APG 130) have two basic functions, generating passwords associated with user identifications and authenticating users 140. Internally APGs 120 may have millions of PUFs 500 which may act like neurons that are addressable with a hash function 510. All PUFs 500 at each cell, node or neuron operate like generic PUFs as described above. Neither the responses nor the challenges are stored in the secure server or the APG 120. The APGs can use any PUF technology, such as, as a non-limiting example, a memory array. When a memory array is used as part of the PUF 500, the operations read, program and erase may be removed to eliminate a possible path for a hacker to learn about the PUF 500.

Description of APGs with Memory Arrays.

A design block of an APG 120 with a memory array is shown in FIG. 5.0. The memory array illustrated in FIG. 5 shows a plurality of cells in the memory array arranged in rows and columns. The APG 120 may have two distinct operating modes, a password generation mode which may be based on the PUF 500 generating a challenge and an authentication mode which is based on the PUF 500 generating a response. In both cases the architecture is a master-slave type, the host 110 is preferably the master and the APG 120 is preferably the slave.

Password Generation:

With reference to FIG. 8, the host 110 may send a user identification to the APG interface management with two types of "instructions": a random number that may be, as a non-limiting example, added to the user identification for the hash function 510 and optionally an instruction for the PUF controller. (Steps 800 and 810) If no instruction is sent for the PUF controller, the PUF controller may have a default instruction, such as, as a non-limiting example, select the cell identified by the location and the next seven (or any other number) cells to the right (or any other direction). In addition, the cells do not have to be continuous within the PUF 500 as the instruction or default may be to select every other (or every third or any other desired number) cell in the PUF 500.

The hash function 510 preferably generates fixed size data streams that have fixed output length regardless of the size of the input. The hash function 510 is preferably "image resistant", which means that any small change in the input to the hash function 510 creates a new hash digest that is totally different than the original digest, and the hash function 510 is preferably "collision resistant", which means that the probability of two different inputs to the hash function 510 creating the same output is extremely low. The hash digest can directly point to an address L in the memory array for the PUF controller. (Step 820) The state machine is the electronic circuit controlling the array in the address of interest. In FIG. 5A, it is shown how the memory array can have respective locations {X, Y, θ} that are randomly spread for the users A, B, C, . . . , N. With hash functions 510, the probability to have two users at the same location, also called a "collision", is minuscule but not necessarily zero. This is not a problem because it is acceptable to have a few user identifications sharing the same passwords.

The PUF controller can generate a challenge, i.e. a data stream, at the address L with the parameter $\mathcal{P}$. The methods to generate challenges may be adjustable, so there may be a need for instructions from the host 110. Using instructions, while not required, may further increase the security of the system. The BIST 530 is the element testing the parameter $\mathcal{P}$ in the array, to compare it with T, and sort out the state of the cells, either "0" or "1" (or in some embodiments "0", "X" and "1"). (Step 830)

Figure 9:
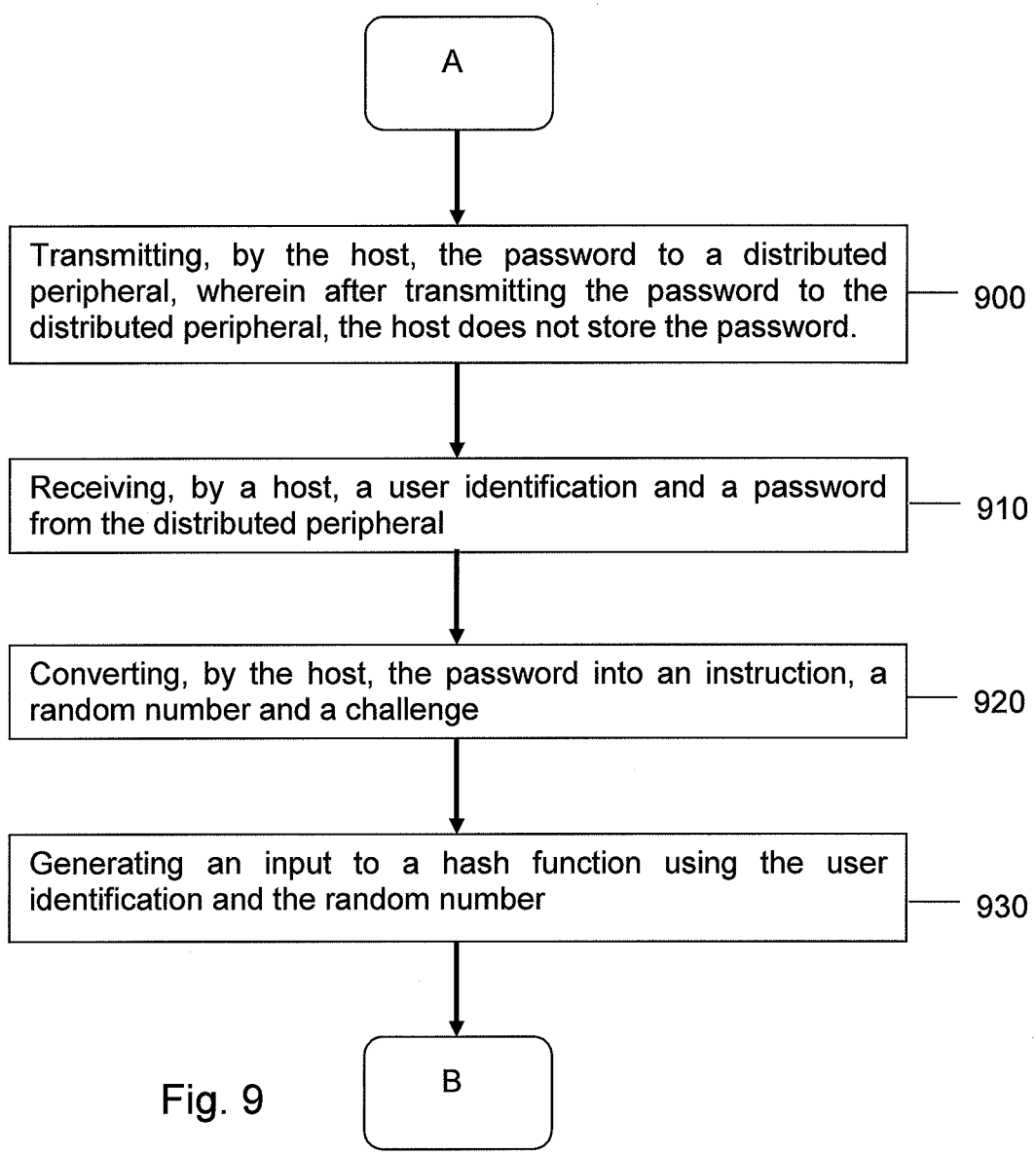
Figure 10:
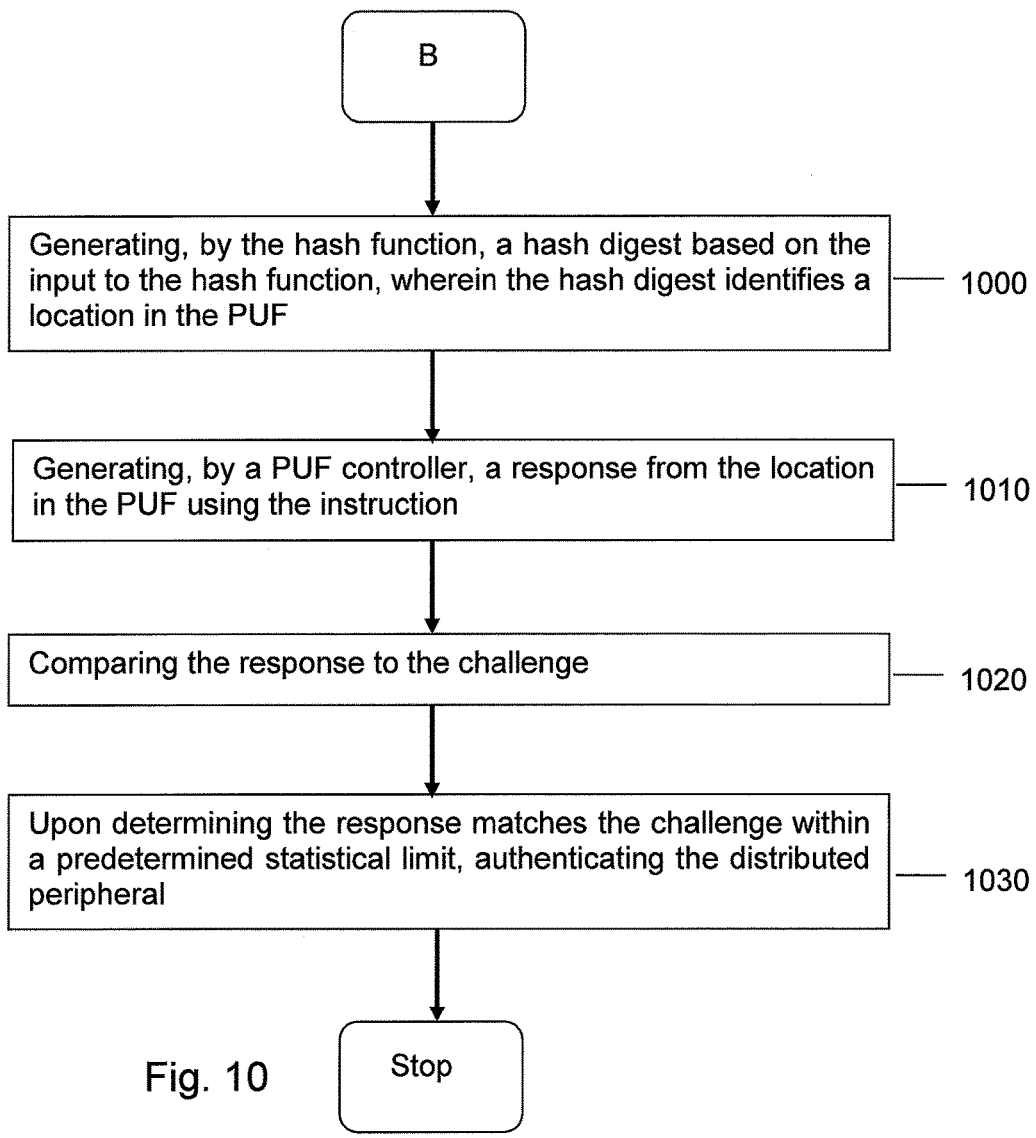

The resulting password generated by the APG 120 is the combination of the challenge, i.e. the data stream generated by the PUF 500, the instructions set used to generate the stream, and the random number that was used by the hash function 510 to generate the address. (Step 840) In practical applications the binary password is encrypted, and converted to alpha-decimal by a method such as the protocol American standard code for information interchange (ASCII). Referring to FIGS. 9 and 10, the password, once generated, may be transmitted to a user 140 or a distributed peripheral 100 for storage in a SM. (Step 900) When the user 140 or distributed peripheral 100 desires to be authenticated, the user 140 or distributed peripheral 100 may transmit the password back to the host 110. (Step 910)

Authentication:

During authentication the host 110 may convert a password into a binary data stream, decrypt the binary data stream and sort the binary data streams into three buckets of data, i.e., a random number, a challenge and, optionally, an instruction. (Step 920) The random number, which together with the user identification, can feed the hash function 510 and find the location L of the neuron, i.e. the PUF 500 that was previously used during password generation. (Step 930) The challenge, i.e. a stream of bits that may be kept in the host cache memory during the authentication cycle. The instruction may be used by the PUF processor and the BIST 530 to generate a response from the cells located at L {X, Y, θ} by testing parameter $\mathcal{P}$. (Steps 1000 and 1010)

Use of Ternary States and Examples of Algorithmic Implementation

Figure 11:
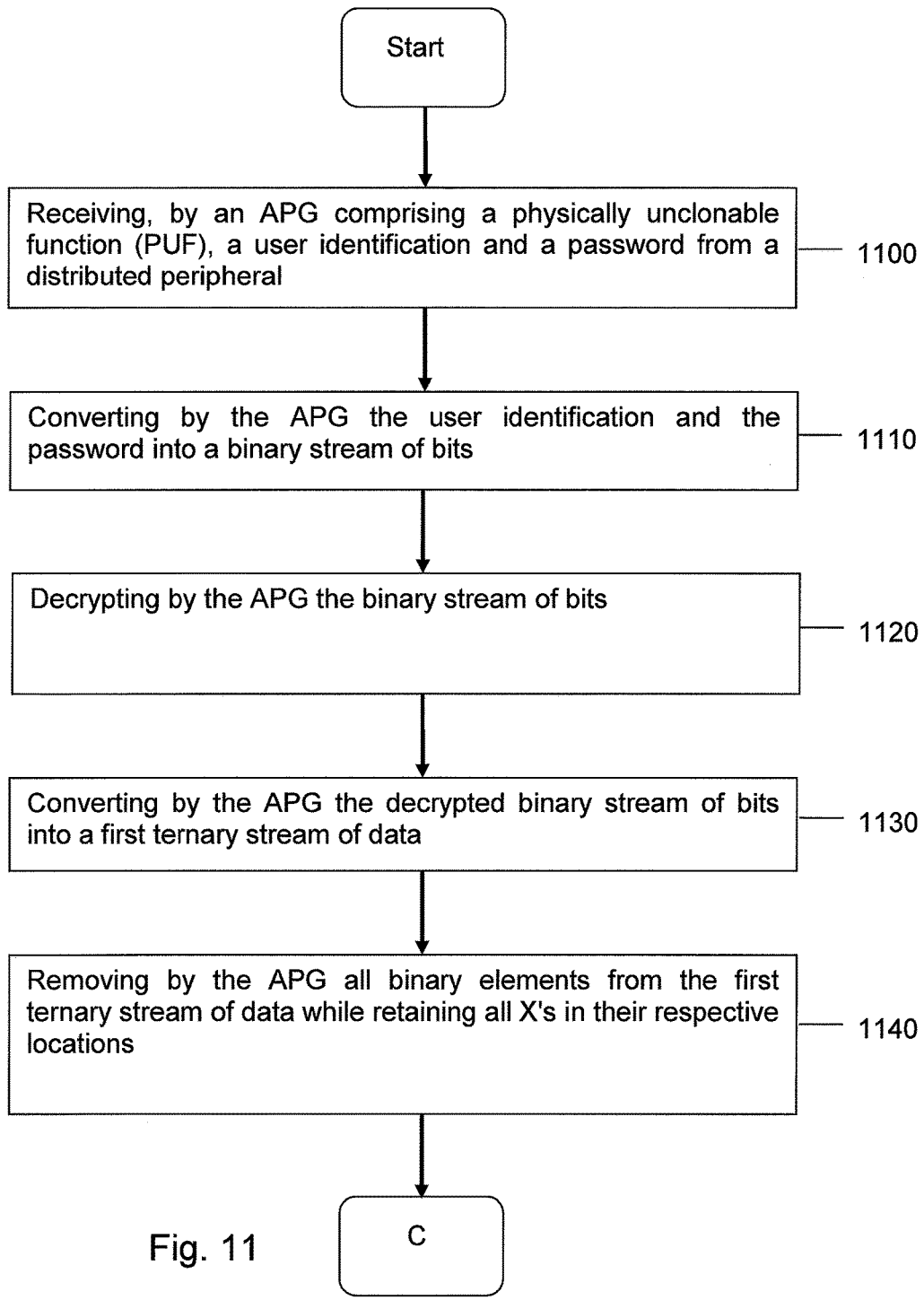
FIGS. 11-13 are flowcharts illustrating a method of using ternary data with a PUF.
Figure 12:
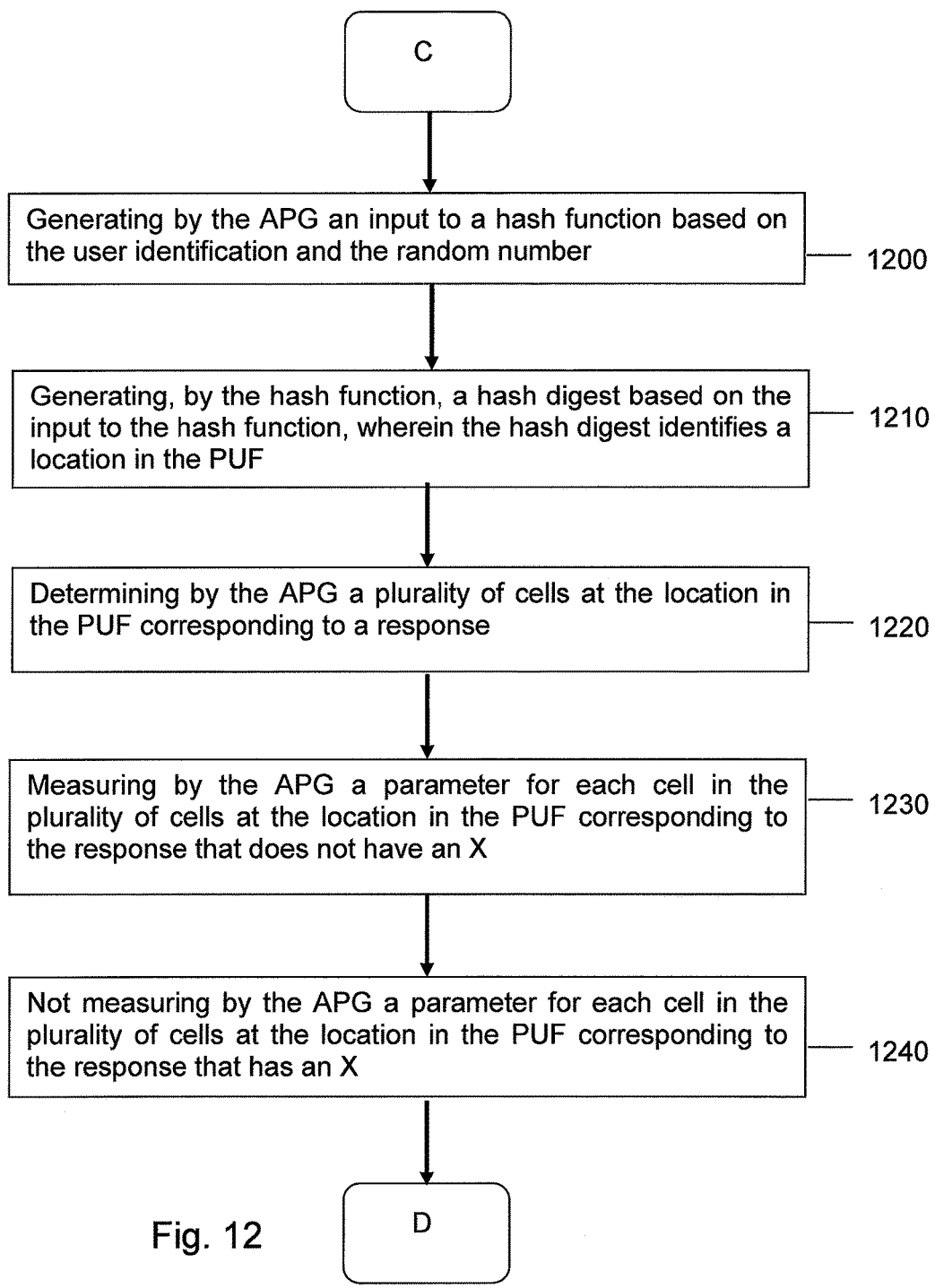
Figure 13:
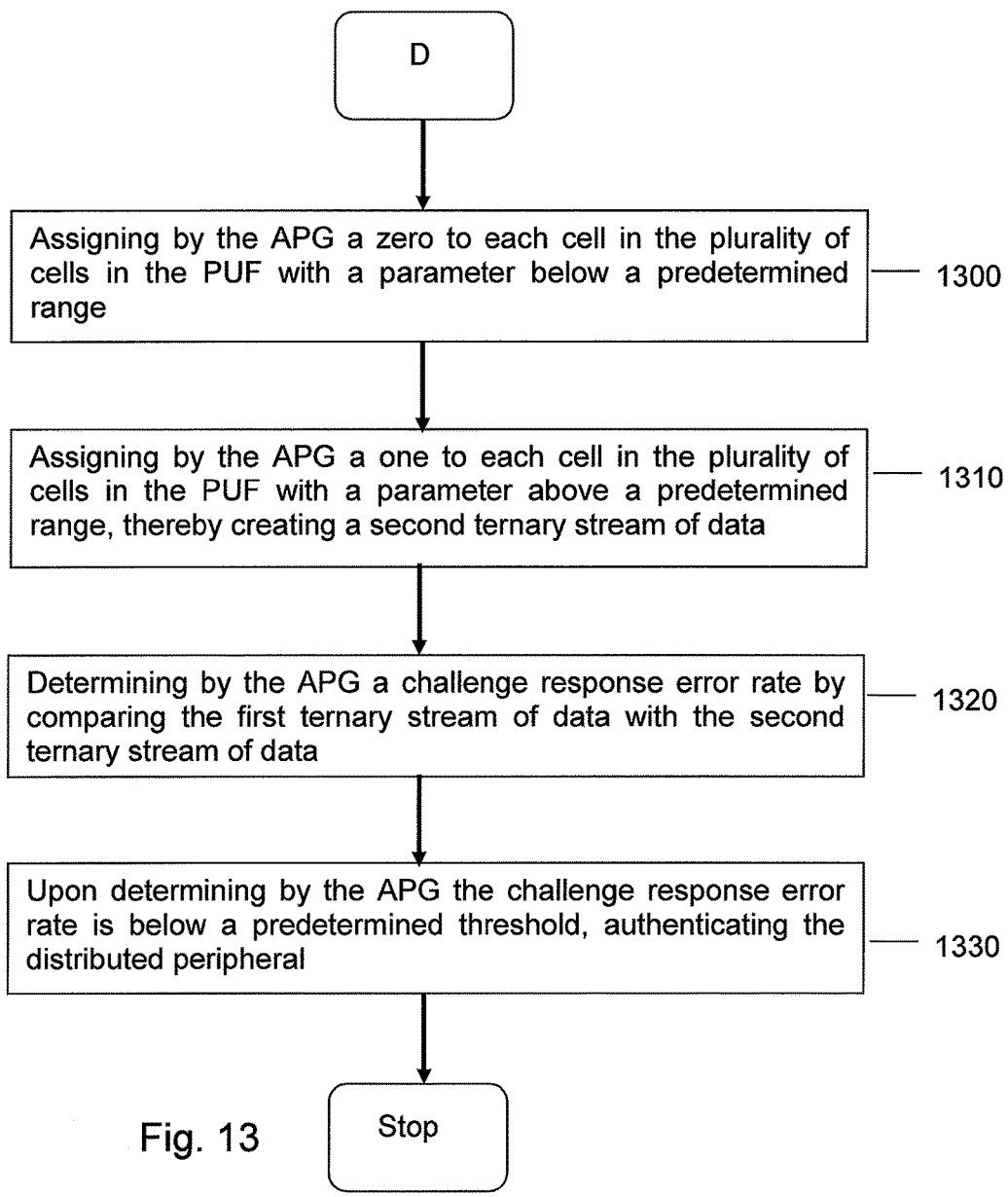

Referring to FIGS. 11-13, rather than testing the cells to simply sort them into "0" and "1" states as a function of the value of parameter $\mathcal{P}$, and the transition threshold T the cells too close to T, shaky, or unstable can carry the ternary state "X". The remaining "0"s and "1"s are thereby more predictable when subjected to repetitive queries which reduces the CRP error rates of the PUFs 500. In this disclosure the use of ternary states to enhance the APG 120 is described with the objective of increasing entropy.

Password Generation:

The challenge as extracted from the PUF 500 can then have ternary states [Ex: (01001XX0X0X011X0)]. The host 110 can convert the challenge into a binary stream of bits by replacing a 0 by (01), a 1 by (10), and a X by either (00), or (11). [Ex: (01 10 01 01 10 11 00 01 11 01 11 01 10 10 00 01)] The password generation sent to the user 140 by the host 110 may then be based on this extended binary stream of bits, with the random number used for the hash function 510. The encryption and conversion to alpha-numeric can be done as a last step. A typical algorithm to generate a password is shown in table 2.0.

TABLE 2.0

Algorithm to generate the password PW associated with User ID

| Step | Description of the instruction | Data stream/information | Who |
|---|---|---|---|
| 1.0 | Convert User ID to binary data stream | bs-1 | Host |
| 2.0 | Generate true random number | trn | Host |
| 3.0 | Hash function with ds-1 and trn | Digest: h(bs-1, trn) | APG |
| 4.0 | Convert hash digest into address | h → {X, Y, θ} | APG |
| 5.0 | Find the cells "A" in the array for challenge generation | {X, Y, θ} → {A1, A2, . . . , An} | APG |
| 6.0 | Measure parameter $\mathcal{P}$ for every cells | {A1, A2, . . . , An}→{P1, P2, . . . , Pn} | APG |
| 7.0 | Generate ternary data stream C ∈ {0, 1, X}, the challenge | {P1, P2, . . . , Pn}→{C1, C2, . . . , Cn} | APG |
| 8.0 | Convert ternary C into a binary stream of data C' 0→(01) 1→(10) X→(11) or (00) | {C1, C2, . . . , Cn} →{C1a, C1b, C2a, C2b, . . . , Cna, Cnb} | Host |
| 9.0 | Add C' and true random number to create M | M = C' + trn | Host |
| 10.0 | Encrypt M to generate the password M' | M' = E(M) | Host |
| 11.0 | Convert M' to alpha-numeric PW | PW | Host |
| 12.0 | Communicate PW to the user | User ID, PW pair | Host |

The data stream resulting from testing parameter $\mathcal{P}$, the response, may then be sent to the host 110 for final authentication, and is matched or compared with the challenge. (Step 1020) The challenge-response-pairs (CRP) should have low mismatch error rates for positive authentication. (Step 1030)

The APG 120 may act as an array of addressable PUFs driven by the host 110. To generate a new password after authentication, a new random number may be generated which may be combined (such as by, as non-limiting examples, adding, subtracting, multiplying or dividing) with the user identification. The new hash digest allows the selection of a new address, thereby generating a different challenge, which can be turned into a new password by the host 110.

A memory array can be a very economical way to design a large array of PUFs 500 at different addressable locations. For example, if the data streams of the challenges are 256 bit long stored with 8 different angles (0, 45, 90, 135, 180, 225, 270, 315), and if the memory has 1 Gbit density, this array can have approximately 32 million different PUF addresses resulting in a very low rate of collision. The cost of one 1 Gbit memory device is much lower than 32 million separate programmable PUFs.

Authentication:

The APG 120 may receive a password from a user 140 or distributed peripheral 100. (Step 1100) The authentication process may start with the conversion of a password data stream from alpha-numeric to digital. (Step 1110) The random number may be removed for the hash function 510 and the remaining data stream may correspond to the challenge [Ex: (01 10 01 01 10 11 00 01 11 01 11 01 10 10 00 01)]. (Step 1120) The host 110 may select for APG 120 only the Xs [Ex: (-----XX-X-X---X-)]. The APG 120 may receive from the hash digest the location L, and tests only the open slots to obtain a response [Ex: (010 11XX0X0X111X0)]. (Steps 1130 and 1140) The host 110 may compare the response to the challenge and may grant positive authentication when the CRP error rate is low or below a predetermined threshold.

In this example only one bit was erroneous, underlined, so the authentication is positive. A typical algorithm for authentication is shown table 3.0.

TABLE 3.0

Algorithm to authenticate User ID & PW pair

| Step | Description of the instruction | Data stream/information | Who |
|---|---|---|---|
| 1.0 | Convert User ID, and PW to binary data stream | bs-1, M' | Host |
| 2.0 | Decrypt M' to find M | M = D(M') = C' + trn | Host |
| 3.0 | Convert binary C' into a ternary stream of data C (01)→0 (10)→1 (11) or (00)→X | $\{C1a, C1b, C2a, C2b, \ldots, Cna, Cnb\}$ →$\{C1, C2, \ldots, Cn\}$ | Host |
| 4.0 | From C, remove binary elements, and keep the location of Xs Xi is empty when Ci ∈ {0, 1}, it is an X when Ci is an X | $\{C1, C2, \ldots, Cn\} \to \{X1, X2, \ldots, Xn\}$ | Host |
| 5.0 | Hash function of ds-1 and trn | Digest: h(bs-1, trn) | APG |
| 6.0 | Convert hash digest into address | h → {X, Y, θ} | APG |
| 7.0 | Find the cells "A" in the array for response generation | $\{X, Y, \theta\} \to \{A1, A2, \ldots, An\}$ | APG |
| 8.0 | Measure parameter 𝒫 only for the cell Xi that are not an X Assume that all Xi cells with an X stay X | $\{A1, A2, \ldots, An\} \to \{P1, P2, \ldots, Pn\}$ | APG |
| 9.0 | Generate ternary data stream R ∈ {0, 1, X}, the response | $\{P1, P2, \ldots, Pn\} \to \{R1, R2, \ldots, Rn\}$ | APG |
| 10.0 | Compare responses R with challenges C, CRP matching? | $\{R1, R2, \ldots, Rn\} = \{C1, C2, \ldots, Cn\}$? | Host |
| 11.0 | If CRP error rate low the authentication is positive | Yes or NO | Host |

The use of ternary states has multiple benefits that strengthen the protocol. The error rate can be much lower than a binary architecture. The cells with "X" states do not have predictable "0"s or "1"s states, removing them reduces the likelihood of a CRP error.

In the unlikely event that a hacker has access to the neuron located at L, the hacker does not have access to the criteria to sort out the "X"s from the "0"s, because this criteria can change randomly during challenge generation. So, the probability that the hacker will be in a position to uncover the challenge is extremely low.

The method increases entropy, i.e. the rate of randomness. If N cells are used to generate a challenge, the theoretical entropy of a binary stream is $2^N$, the entropy of a ternary stream is $3^N = 2^N \times 1.5^N$. If N=128, $1.5^N = 3.4 \cdot 10^{22}$ which is very significant.

Use of a Secure Memory (SM):

FIGS. 6A, 6B and 6C illustrate the use of an APG 120 for access control when the user 140 has an ID card with an SM. At first (6A), to personalize the card, a password and a user identification are downloaded in the SM, following the algorithm of Table 2.0. For authentication (6B) the password and user identification are transmitted back to the host 110. The host 110 interacts with the APG 120, as presented in table 3.0, to get a response. Finally, if the CRP error rate is low, access is granted to the user 140, i.e., the user 140 (or the distributed peripheral 100 used by the user 140) is authenticated.

The entire protocol can be secured by other cryptographic methods such as PKI as shown in FIG. 4.0. During the protocol the user 140 does not have to be involved, the user's SM may be in direct communication with the host 110.

The SM is the only node in the cyber physical system storing the password and the user identification and represents a weak spot that should be protected. Current SMs, when part of smart secure cards, are designed and manufactured with stringent methods that reduce the risks. Multi-factor authentication, for example, enhance the overall security of SM with methods such as biometric authentication verifying that the user 140 can provide unclonable prints.

The APG 120 quick password generation capability opens the possibility to automatically (meaning without human intervention) replace the password at each usage and download the password directly to the SM. As a result, hacking the password during authentication is a pointless attack because the password cannot work a second time. For example, attacks based on side channel attacks during authentication, such as differential power analysis (DPA), that can extract the password during authentication are not effective. The only remaining vulnerability becomes the crypto-analysis of the card prior of its usage, and this during step-1, the password downloading, and storage. The damage and liability will however be reduced to a single event.

Bandwidth Enhancement.

The generation of challenges and responses from a PUF 500 for password generation and authentication is a slow process compared with the reading a lock-up table with user identifications and passwords. Reading 128 bits from a non-volatile memory such as flash memory takes typically 10 μs, while generating a PUF challenge from a flash memory may take as much as 10 ms, one thousand times more. This is an important limitation for applications with large numbers of users 140, the rate of password generation per second, and the rate of authentication per second, also called bandwidth of the system may need improvement. One way to improve the bandwidth of the system is to use a faster memory technology such as resistive RAM (ReRAM), however this technology is not yet as mature in manufacturing as flash memory.

A novel architecture to increase the bandwidth of the system is presented in FIG. 7.0. The illustrated architecture is taking advantage of the fact that the host 110 and APG 120 (H/APG 130) system is scalable, each system can be integrated in an array of H/APG 130 acting systems and be selected by an X-Y demux circuitry.

As a non-limiting example, a router can direct the user identification and password pair to a particular H/APG 130 system based on the first alpha-numeric element of the user identification. In the addressable array represented in FIG. 7.0, alpha-numerical signs are associated with each H/APG 130 system. If a user identification starts with a C, the user identification and password pair can be routed to the third column, and first row of the networked array. This H/APG 130 system can find L, 𝒫, complete the authentication protocol, and generate a new password.

This architecture is scalable to a large number of systems, with bandwidth increasing almost proportionally with the number of H/APG 130 systems.

Commercially available routers currently drive more than 1 million addresses in wired telecommunication applications handling IP addresses. The application described here is similar, and can leverage such architectures. Considering that the network of H/APG 130s only perform password generation and authentication, the design of routers can be simplified.

Assuming that a single PUF 500 needs 10 ms to generate a response, a network of only 1,000 APGs can reach a throughput of 100,000 users 140 per second, which is enough for networks with large membership. The routers may have lock-up tables to route the user identifications to their nodes, however such tables do not contain confidential information and do not need to be protected.

In another embodiment, a cryptographic protocol based on user identification and password pairs for access control have a data-base-free component build with unclonable physical elements may operate in the following way. The unclonable physical elements can generate new user identification and password pairs that can be associated with predictable physical properties. During the authentication cycle, the previously generated pair of user identification and password can be recognized by its associated predictable physical properties that are similar to the one previously recognized. After an authentication cycle, a new password can be generated with the same user identification, but with different associated predictable physical properties.

In another embodiment, a cryptographic protocol based on user identification and password pairs for access control having a data-base-free virtual component build with mathematical or software elements may operate in the following way. The mathematical or software elements can act as predictable physical elements, and can generate new user identification and password pairs that can be associated with properties that are similar than the ones coming from predictable physical elements. During the authentication cycle, the previously generated pair of user identification and password can be recognized by its predictable properties that are similar than the one previously recognized. After an authentication cycle, a new password can be generated with the same user identification, but with different associated properties that are similar than the ones coming from predictable physical elements;

In another embodiment, a cryptographic protocol based on user identification and password pairs for access control having a database-free appliance with an addressable array of numerous unclonable physical nodes that have predictable properties, while being randomly different from each other's. During the password generation cycle of this protocol, each user identification is related to just one particular node of this array, located in one particular location. The physical predictable properties of the node that are related directly to a particular user identification are partially used to generate the password. The passwords may be the combination of two sets of information, the predictable properties of their particular node as previously described and when associated with user identification, the exact location of their particular node. During an authentication cycle, the information contained in the pair user identification and password allows the identification of the node related to the pair, and the measurement of the physical predictable properties of the particular node. If the measurement of the physical predictable properties of the node match the measurement of these properties done during password generation the authentication is considered as positive, and access to the network is granted. After successful authentication, a new node with physical predictable properties can be selected for the same user identification and a new password can be generated for future authentication.

In another embodiment, the password generation may include additional recognizable factors to increase the complexity of the password and make it more difficult to divert.

In another embodiment, the password generation may include additional recognizable factors to measure the physical predictable properties of the node.

In another embodiment, the previously described protocols are combined with additional cryptographic protocols to secure the communication within the network, and transfer securely the password and user identification between the host 110 and the client device. These additional protocols include, but are not limited to, public key infrastructure (PKI), use of private keys, use of symmetrical and asymmetrical cryptography, hash functions, use of additional PUFs 500 in the client side, and the use of biometric prints.

In another embodiment, the previously described protocols use an array of components built with physical elements, or virtual physical elements, and a router to increase the bandwidth and throughput of the protocol.

In another embodiment, a router may use the information contained in the user identification to route the communication to a particular node, i.e., cell, of the array.

In another embodiment, the cryptographic protocols previously described may be integrated in a network with a set of users remembering their user identifications and passwords, or with distributed elements capable of storing the user identifications and password. The distributed elements include, not to be limited by, Internet of Things (IoT), laptop and desktop computers, terminals, workstations, phones, smart phones, smart cards, ID cards, banking cards, SIM cards, smart passports, secure memories, secure elements, smart sensors, smart peripheral devices, RF-ID cards, and tags associated with inventory management.

In another embodiment, a one time only password protocol is used as part of the invention.

In another embodiment, two passwords may be generated by the methods previously described for each user identifications. One of the password may be used for future interaction between the host 110 and client, the host 110 has to send again the password to the client terminal as authentication. The second password may be used for client authentication. The host 110 only needs to store the first password for future reference, not the second password.

In another embodiment of the invention, a method is disclosed for generating a first password and a second password for a physically unclonable function 500 (PUF). The first password may be used by the distributed peripheral 100 to authenticate the host 110 and the host 110 may use the second password to authenticate the distributed peripheral 100. This method has the advantage of allowing both parties to authenticate each other, thereby making the system less likely to be compromised.

A host 110 may transmit a user identification, a first random number, a second random number, a first instruction and a second instruction to an addressable PUF generator 120 (APG) interface manager. A first input may be generated for a hash function 510 using the user identification and the first random number. A second input may be generated for the hash function 510 using the user identification and the second random number. The hash function 510 may generate a first hash digest based on the first input to the hash function 510, wherein the first hash digest identifies a first location within an array of PUFs 500. The hash function 510 may generate a second hash digest based on the second input to the hash function 510, wherein the second hash digest identifies a second location with an array of PUFs. A PUF controller may generate a first challenge from the first location in the PUF 500 using the first instruction. The PUF controller may generate a second challenge from the second location in the PUF 500 using the second instruction. A first password may be created using the first instruction, the first random number and the first challenge, wherein the first password is configured to be converted back into the first instruction, the first random number and the first challenge. A second password may be created using the second instruction, the second random number and the second challenge, wherein the second password is configured to be converted back into the second instruction, the second random number and the second challenge. The host 110 may transmit the first password to a distributed peripheral 100, wherein after transmitting the first password to the distributed peripheral 100, the host 110 stores the first password in a first password database. The host 110 may also transmit the second password to the distributed peripheral 100, wherein after transmitting the second password to the distributed peripheral 100, the host 110 does not store the second password.

In another embodiment of the invention, a host 110 and a distributed peripheral 100 may authenticate each other once two passwords have been created with the host 110 storing the first password and the distributed peripheral 100 storing the second password. The host 110 may transmit the first password to the distributed peripheral 100. Upon the distributed peripheral 100 authenticating the host 110 using the first password, the host 110 may receive a user identification and the second password from the distributed peripheral 100. The host 110 may convert the second password into a second instruction, a second random number and a second challenge. The second input to the hash function 510 may be generated using the user identification and the second random number. The hash function 510 may generate the second hash digest based on the second input to the hash function 510, wherein the second hash digest identifies a second location in the array of PUFs 500. The first location and the second location will be the same if the distributed peripheral 100 transmitted the correct user identification and the correct second password. The PUF controller may generate a response from the second location in the PUF 500 using the second instruction. The response may be compared to the second challenge. Upon determining the response matches the second challenge within a predetermined statistical limit, authenticating the distributed peripheral 100. If it is determined that the response does not match the second challenge, the distributed peripheral 100 is not authenticated. It should be noted that, as in the other embodiments, the user identification and/or the second password are not stored in a database with other user identifications and/or other passwords.

This is an effective way to increase the protection of the network to prevent an attack from a malicious network trying to extract the password from the client-terminal. Considering that our new method can generate password on demand, generating two password should be very effective. Please note that the method require a separate database to store the password used for host 110 authentication.

Referring to FIGS. 11-13, an embodiment is disclosed for an addressable physically unclonable function generator 120 (APG) to authenticate a distributed peripheral 100 (or user 140). In preferred embodiments, the APG 120 comprises an array of physically unclonable functions 500 (PUFs) and receives a user identification and a password from the distributed peripheral 100. (Step 1100) The APG 120 may convert the user identification and the password into a binary stream of bits. (Step 1110) The APG 120 may decrypt the binary stream of bits and convert the decrypted binary stream of bits into a first ternary stream of data. (Steps 1120 and 1130) The APG 120 may remove all binary elements from the first ternary stream of data while retaining all X's in their respective locations. (Step 1140) The APG 120 may generate an input to a hash function 510 based on the user identification and the random number. (Step 1200) The hash function 510 may generate a hash digest based on the input to the hash function 510, wherein the hash digest identifies a location in the array of PUFs 500. (Step 1210) The APG 120 may locate a plurality of cells at the location in the PUF 500 corresponding to a response. (Step 1220) The APG 120 may measure a parameter for each cell in the plurality of cells at the location in the PUF 500 corresponding to the response that does not have an X. (Step 1230) To save time, the APG 120 does not need to measure a parameter for each cell in the plurality of cells at the location in the PUF 500 corresponding to the response that has an X. (Step 1240) The APG 120 may assign a zero to each cell in the plurality of cells in the PUF 500 with a parameter below a predetermined range. (Step 1300) The APG 120 may assign a one to each cell in the plurality of cells in the PUF 500 with a parameter above a predetermined range, thereby creating a second ternary stream of data. (Step 1310) The APG 120 may determine a challenge response error rate by comparing the first ternary stream of data with the second ternary stream of data. (Step 1320) Upon determining by the APG 120 the challenge response error rate is below a predetermined threshold, the distributed peripheral 100 is authenticated. (Step 1330) If the challenge response error rate is above a predetermined threshold, the distributed peripheral 100 is not authenticated.

Figure 14:
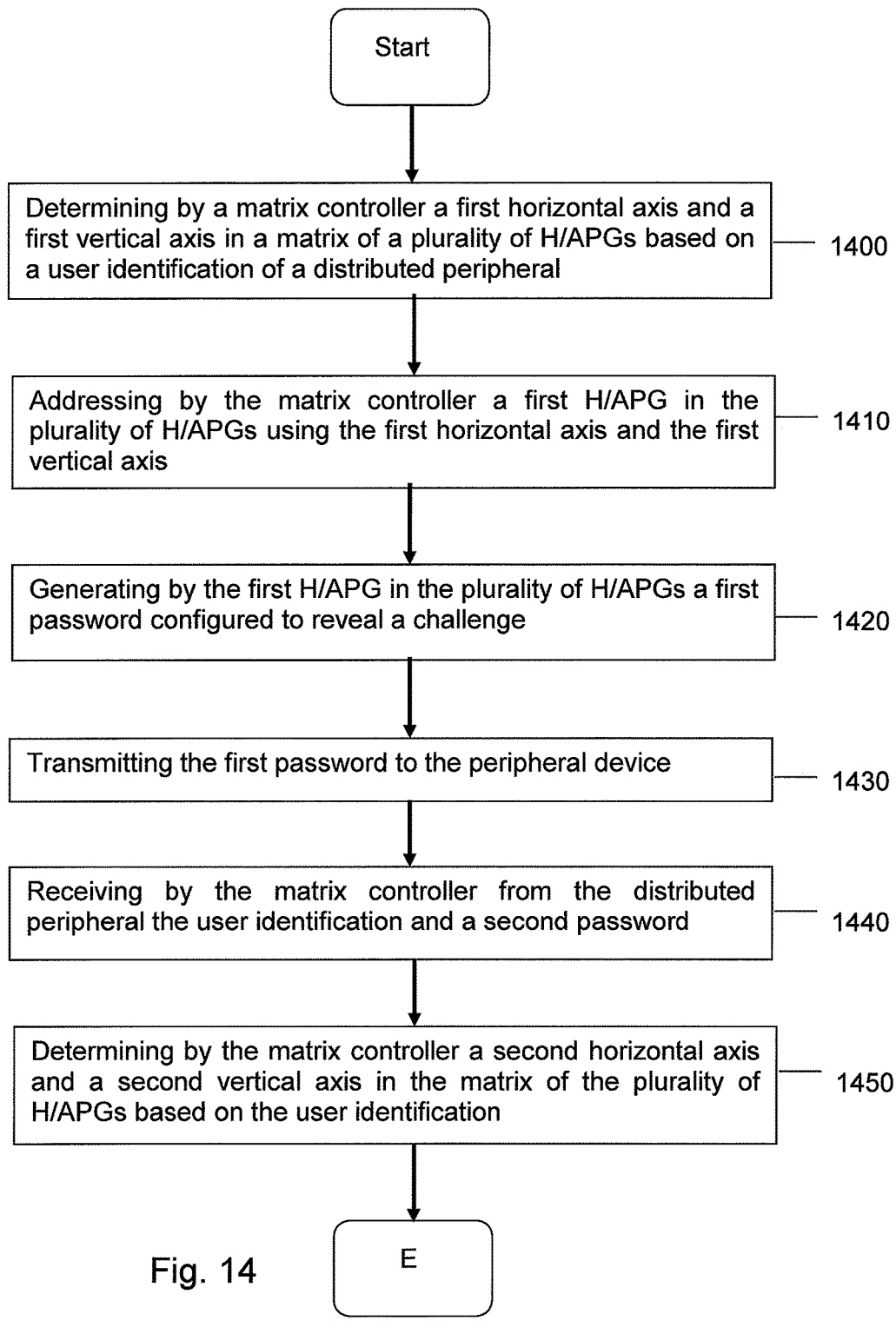
FIGS. 14-15 are flowcharts illustrating a method of combining a plurality of host and APG (H/APG) into a high bandwidth network for performing the methods of the current invention.
Figure 15:
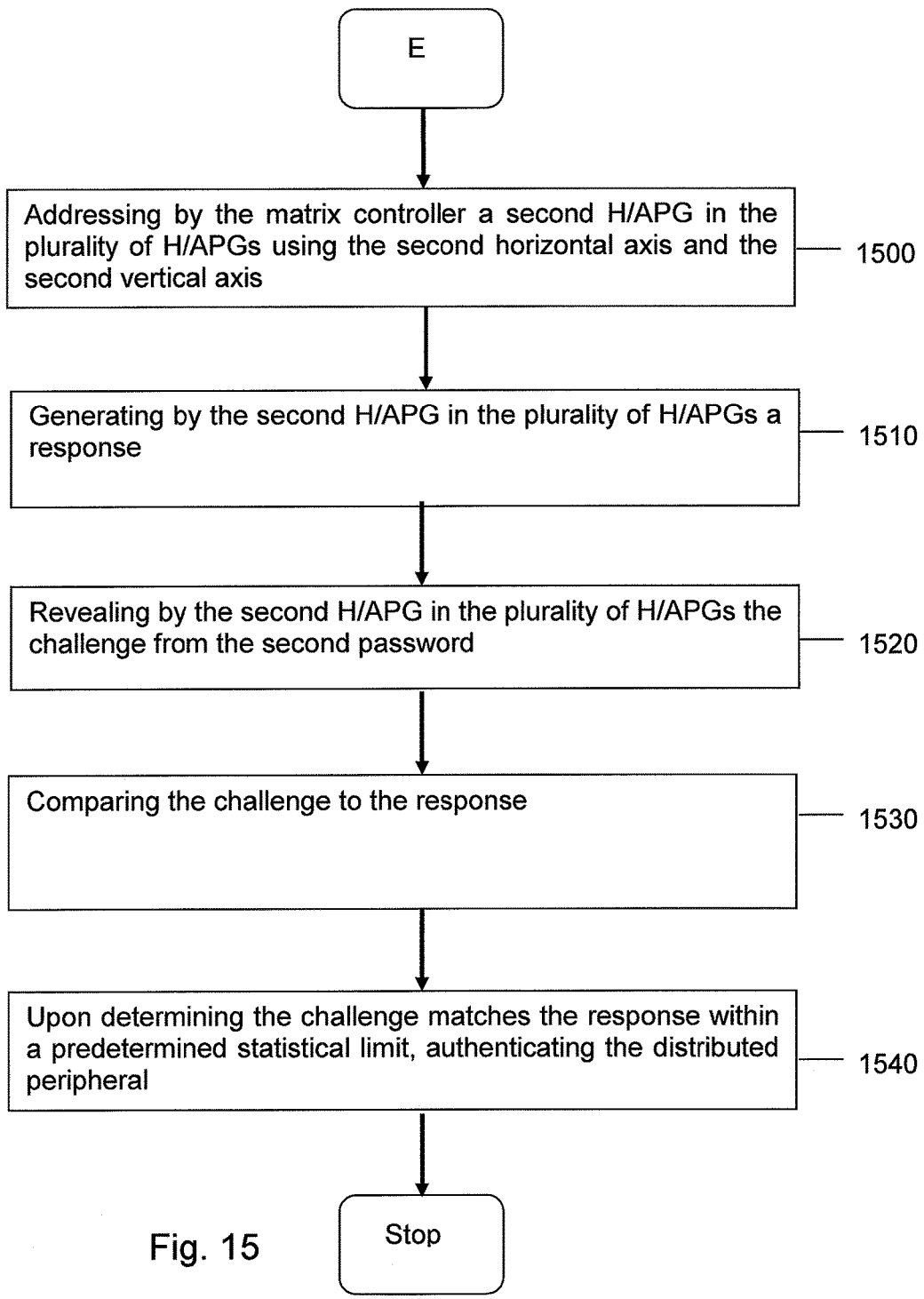

Referring to FIGS. 14-15, an embodiment is disclosed for a host 110 and an addressable physically unclonable function generator 130 (H/APG) in a plurality of H/APGs 130 to generate a password and authenticate a distributed peripheral 100. Using a plurality of H/APGs 130 allows the system to be scaled up and improves the speed and efficiency of the invention. A matrix controller 700 may determine a first horizontal axis and a first vertical axis in a matrix of a plurality of H/APGs 130 based on a user identification of a distributed peripheral. (Step 1400) The matrix controller may address a first H/APG in the plurality of H/APGs using the first horizontal axis and the first vertical axis. (Step 1410) The first H/APG 130 in the plurality of H/APGs may generate a first password configured to reveal a challenge. (Step 1420) The first password may be transmitted over a computer network to the peripheral device 100. (Step 1430) When the distributed peripheral 100 desires to be authenticated, the matrix controller may receive from the distributed peripheral 100 the user identification and a second password. (Step 1440) The matrix controller may determine a second horizontal axis and a second vertical axis in the matrix of the plurality of H/APGs 130 based on the user identification. (Step 1450) The matrix controller 700 may address a second H/APG 130 in the plurality of H/APGs using the second horizontal axis and the second vertical axis. (Step 1500) The second H/APG 130 in the plurality of H/APGs may generate a response. (Step 1510) The second H/APG 130 in the plurality of H/APGs may reveal the challenge from the second password. (Step 1520) The challenge may be compared to the response. (Step 1530) Upon determining the challenge matches the response within a predetermined statistical limit, the distributed peripheral 100 (or user 140) may be authenticated. (Step 1540) Upon determining the challenge does not match the response within a predetermined statistical limit, the distributed peripheral 100 is not authenticated. In preferred embodiments, the matrix of the plurality of H/APGs 130 is configured so that two or more H/APGs in the matrix of the plurality of H/APGs may generate passwords and/or authenticate distributed peripherals at overlapping times. Allowing a plurality of H/APGs in the matrix to operate at the same or overlapping times greatly increases the speed and efficiency of the invention.

Other embodiments and uses of the above inventions will be apparent to those having ordinary skill in the art upon consideration of the specification and practice of the invention disclosed herein. It should be understood that features listed and described in one embodiment may be used in other embodiments unless specifically stated otherwise. The specification and examples given should be considered exemplary only, and it is contemplated that the appended claims will cover any other such embodiments or modifications as fall within the true scope of the invention.

The invention claimed is:

1. A method for a host and an addressable physically unclonable function generator (H/APG) in a plurality of H/APGs to generate a password, comprising the steps of:
   determining, by a matrix controller, a horizontal axis and a vertical axis in a matrix of the plurality of H/APGs based on a user identification of a distributed peripheral;
   addressing, by the matrix controller, the H/APG in the plurality of H/APGs using the horizontal axis and the vertical axis;
   generating, by the H/APG in the plurality of H/APGs, the password configured to reveal a challenge; and
   transmitting the password to the distributed peripheral.

2. The method of claim 1, wherein the password is permanently stored on the distributed peripheral and not permanently stored anywhere else.

3. The method of claim 1, wherein each H/APG in the plurality of H/APGs comprises an array of physically unclonable functions (PUFs), and each PUF comprises a memory array configured to generate a plurality of challenge-response pairs that are unique to the PUF due to manufacturing variations in the PUF as compared to other PUFs.

4. The method of claim 1, wherein each H/APG in the plurality of H/APGs comprises an array of physically unclonable function (PUFs), and each PUF comprises an integrated circuit configured to generate a plurality of challenge-response pairs that are unique to the integrated circuit due to manufacturing variations in the integrated circuit as compared to other integrated circuits.

5. The method of claim 1, wherein the distributed peripheral is a connected device in an Internet of Things.

6. The method of claim 1, wherein the matrix of the plurality of H/APGs is configured so that two or more H/APGs in the matrix of the plurality of H/APGs generate two or more passwords at overlapping times.

7. A method for a host and an addressable physically unclonable function generator (H/APG) in a plurality of H/APGs to generate a password, comprising the steps of:
   determining, by a matrix controller, a horizontal axis and a vertical axis in a matrix of a plurality of H/APGs based on a user identification of a distributed peripheral;
   addressing, by the matrix controller, the H/APG in the plurality of H/APGs using the horizontal axis and the vertical axis;
   generating, by the H/APG in the plurality of H/APGs, the password configured to reveal a challenge; and
   transmitting the password to the distributed peripheral, wherein after transmitting the password to the distributed peripheral, the host does not retain or store the user identification or the password so as to prevent a hacker from obtaining the user identification or the password from the host.

8. The method of claim 7, wherein the password is permanently stored on the distributed peripheral and not permanently stored anywhere else.

9. The method of claim 7, wherein each H/APG in the plurality of H/APGs comprises an array of physically unclonable functions (PUFs), and each PUF comprises a memory array configured to generate a plurality of challenge-response pairs that are unique to the PUF due to manufacturing variations in the PUF as compared to other PUFs.

10. The method of claim 7, wherein each H/APG in the plurality of H/APGs comprises an array of physically unclonable function (PUFs), and each PUF comprises an integrated circuit configured to generate a plurality of challenge-response pairs that are unique to the integrated circuit due to manufacturing variations in the integrated circuit as compared to other integrated circuits.

11. The method of claim 7, wherein the distributed peripheral is a connected device in an Internet of Things.

12. The method of claim 7, wherein the matrix of the plurality of H/APGs is configured so that two or more H/APGs in the matrix of the plurality of H/APGs generate two or more passwords at overlapping times.

13. A method for a host and an addressable physically unclonable function generator (H/APG) in a plurality of H/APGs to generate a first password for a first distributed peripheral and a second password for a second distributed peripheral, comprising the steps of:
   receiving, by a matrix controller, a first user identification for the first distributed peripheral;
   determining, by the matrix controller, a first horizontal axis and a first vertical axis in a matrix of a plurality of H/APGs based on the first user identification of the first distributed peripheral;
   addressing, by the matrix controller, a first H/APG in the plurality of H/APGs using the first horizontal axis and the first vertical axis;
   generating, by the first H/APG in the plurality of H/APGs, the first password configured to reveal a first challenge;
   transmitting the first password to the first distributed peripheral, wherein after transmitting the first password to the first distributed peripheral, the host does not retain or store the first password so as to prevent a hacker from obtaining the first password from the host;
   receiving, by the matrix controller, a second user identification for the second distributed peripheral;
   determining, by the matrix controller, a second horizontal axis and a second vertical axis in the matrix of the plurality of H/APGs based on the second user identification of the second distributed peripheral;
   addressing, by the matrix controller, a second H/APG in the plurality of H/APGs using the second horizontal axis and the second vertical axis;
   generating, by the second H/APG in the plurality of H/APGs, the second password configured to reveal a second challenge; and
   transmitting the second password to the second distributed peripheral, wherein after transmitting the second password to the second distributed peripheral, the host does not retain or store the second password so as to prevent a hacker from obtaining the second password from the host.

14. The method of claim 13, wherein the first password is permanently stored on the first distributed peripheral, the second password is permanently stored on the second distributed peripheral and the first password and the second password are not permanently stored anywhere else.

15. The method of claim 13, wherein each H/APG in the plurality of H/APGs comprises an array of physically unclonable functions (PUFs), and each PUF comprises a memory array configured to generate a plurality of challenge-response pairs that are unique to the PUF due to manufacturing variations in the PUF as compared to other PUFs.

16. The method of claim 13, wherein each H/APG in the plurality of H/APGs comprises an array of physically unclonable function (PUFs), and each PUF comprises an integrated circuit configured to generate a plurality of challenge-response pairs that are unique to the integrated circuit due to manufacturing variations in the integrated circuit as compared to other integrated circuits.

17. The method of claim 13, wherein the first distributed peripheral and the second distributed peripheral are connected devices in an Internet of Things.

18. The method of claim 13, wherein the matrix of the plurality of H/APGs is configured so that two or more H/APGs in the matrix of the plurality of H/APGs generate two or more passwords at overlapping times.

* * * * *